(12) United States Patent
Pierce et al.

(10) Patent No.: US 6,722,112 B2
(45) Date of Patent: Apr. 20, 2004

(54) REVERSER CONTROL FOR A COMBINE

(75) Inventors: Johann H. Pierce, East Moline, IL (US); Joseph A. Teijido, East Moline, IL (US); Dennis M. Roe, East Moline, IL (US)

(73) Assignee: Deere & Company, Moline, IL (US)

( * ) Notice: Subject to any disclaimer, the term of this patent is extended or adjusted under 35 U.S.C. 154(b) by 34 days.

(21) Appl. No.: 10/086,055

(22) Filed: Feb. 28, 2002

(65) Prior Publication Data

US 2003/0159416 A1 Aug. 28, 2003

(51) Int. Cl.$^7$ ............................................. A01D 69/00
(52) U.S. Cl. ................................... 56/11.2; 460/16
(58) Field of Search ........................ 74/335, 339, 355; 477/115; 56/11.2, 11.3, 11.4, 11.5, 11.7, DIG. 6; 460/16

(56) References Cited

U.S. PATENT DOCUMENTS

| | | |
|---|---|---|
| 3,375,738 A | 4/1968 | Love |
| 3,759,021 A | 9/1973 | Schreiner et al. |
| 4,133,225 A | 1/1979 | Love |
| 4,138,837 A | 2/1979 | Love |
| 4,160,456 A | 7/1979 | Hawkins et al. |
| 4,218,864 A | 8/1980 | Allemeersch et al. |
| 4,430,847 A | 2/1984 | Tourdot et al. |
| 4,467,590 A | 8/1984 | Musser et al. |
| 4,470,243 A | 9/1984 | Rayfield |
| 4,512,139 A | 4/1985 | Musser et al. |
| 4,663,919 A | 5/1987 | Stroh et al. |
| 4,879,868 A | 11/1989 | Love |
| 6,247,295 B1 * | 6/2001 | Hansen et al. ............ 56/10.2 A |
| 6,390,915 B2 | 5/2002 | Brantley et al. |
| 6,393,928 B1 * | 5/2002 | Watanabe ................. 74/336 R |
| 6,396,173 B1 * | 5/2002 | Prampolini .................. 310/12 |

OTHER PUBLICATIONS

John Deere, Parts Catalog for Reverser Actuator, 2 pages, date unknown.

* cited by examiner

Primary Examiner—Thomas B. Will
Assistant Examiner—Meredith Petravick
(74) Attorney, Agent, or Firm—The Law Office of Randall T. Erickson, P.C.

(57) ABSTRACT

A mechanism is provided for engaging and disengaging the reverse operation of a feederhouse of a harvesting apparatus. The mechanism solves the problem of accurate engagement between the shift collar or driving element and the reverse gear, teeth or splines and the forward gear, teeth or splines of the feederhouse transmission. The mechanism comprises an actuator, electrically controlled, which loads or compresses a spring, wherein the spring exerts a shifting force on a shift shaft or shift fork of the gearbox which automatically moves the shift collar or driving element of the transmission into either a forward or reverse drive position when the gear, teeth of splines of the shift collar is aligned or meshed with the gear, teeth or splines of either the reverse or forward drive of the feederhouse transmission.

16 Claims, 4 Drawing Sheets

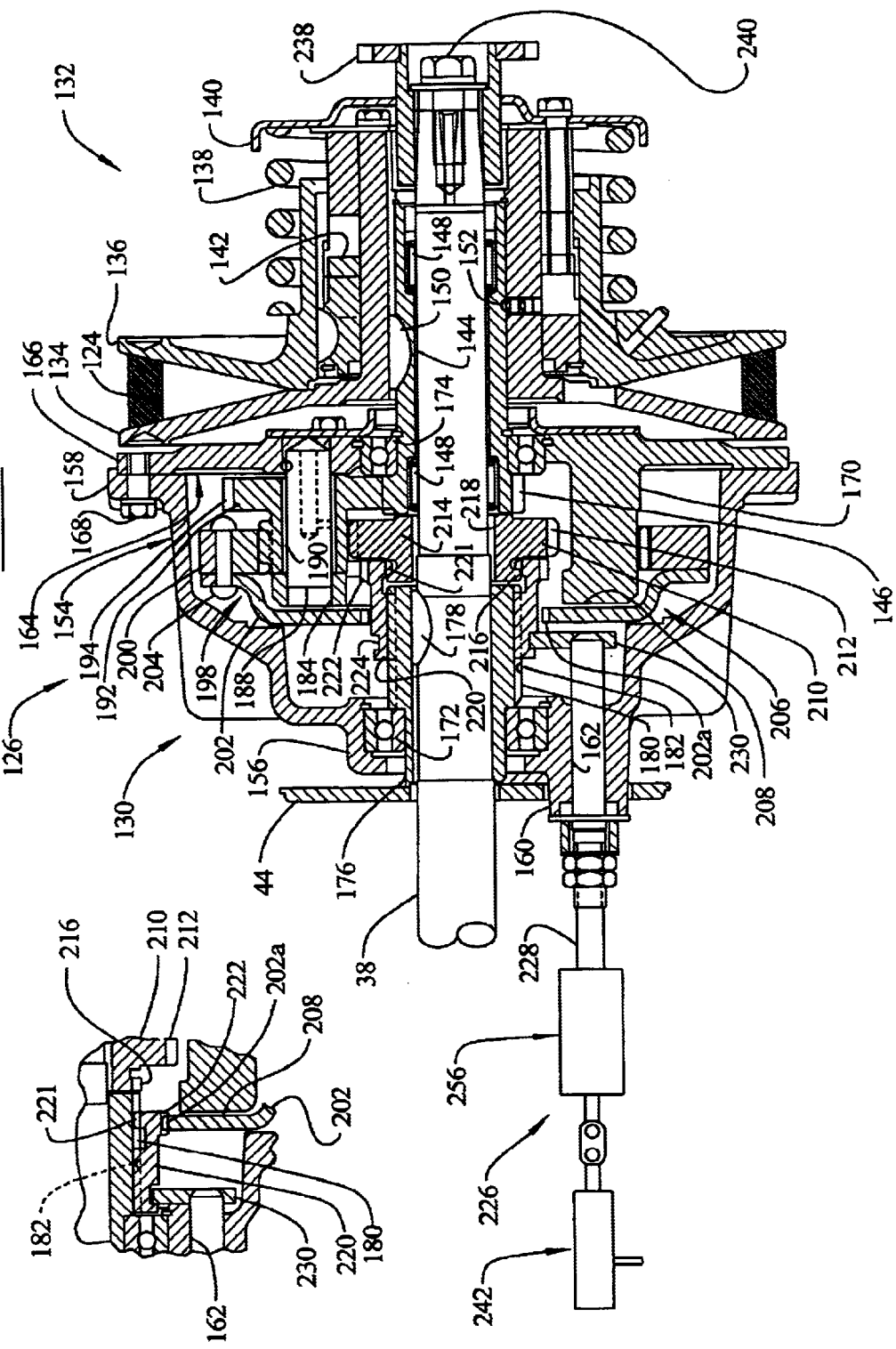

REVERSER CONTROL FOR A COMBINE

TECHNICAL FIELD OF THE INVENTION

The invention is directed to a reverser for a feederhouse of a harvesting apparatus. The reverser is particularly well adapted for use in combines.

BACKGROUND OF THE INVENTION

Agricultural combines are typically provided with an outwardly extending feederhouse for directing harvested crop from a harvesting platform into the combine. In difficult crop conditions, it is possible to plug the feederhouse by the harvested grain. As such, some method is needed to free the plug.

U.S. Pat. No. 4,879,868 discloses a reverser assembly that can be used to reverse the feederhouse used for transmitting small grains into the combine. The main driven sheave is provided with an externally toothed cooperating assembly that is selectively engaged by an internally splined drive element that can be moved along the drive shaft. The drive shaft is provided with external splines that cooperate with the internal splines of the drive element so that when the drive element is operably coupled to the toothed cooperating assembly of the main driven sheave, the main driven sheave drives the drive shaft. The drive element is also provided with a gear assembly that can be operably coupled to a toothed cooperating assembly located on the second driven sheave. By sliding the driven element away from the main driven sheave, the drive element disengages the toothed cooperating assembly of the main driven sheave and the second toothed element engages the toothed cooperating assembly of the second driven sheave. Thereby, the main driven sheave becomes operatively disengaged from the drive shaft and the second driven sheave now drives the drive shaft. By coupling the second toothed assembly to the toothed cooperating assembly on the second driven sheave, the output is effectively reversed, reversing the rotation of the feederhouse drive shaft.

The positioning of the drive element is controlled by a push/pull cable having a handle located in the operator's cab of the combine. The push/pull cable is operatively coupled to a bell crank that is coupled to the drive element by a link.

Another feederhouse drive and reverser assembly is described in U.S. Pat. No. 4,138,837. In this patent, a planetary gear set arrangement is described that facilitates the provision of a reverse drive, including a single ring gear assembly and a control linkage. The ring gear is maintained in his radial position by its engagement of the planetary pinions of the gear set. A shifting collar, splined to an output shaft, transmit output from the planetary gear set to that shaft, selectively engaging either a sun gear for the reduced speed forward drive or, internally, a hub plate attached to the ring gear for the reverse drive. The control linkage includes a push-pull control cable connected to a manual control handle located in the operator's station.

In the John Deere 10 Series Combine, the reverser is activated by pressing a pedal in the cab that is connected to a push/pull cable routed to the shift collar or drive element in the gearbox. However, when the selected gear and shift collar are misaligned, it is necessary to maintain pressure on the pedal and "jog" the front end drive to the on and off position until the gear and shift collar are aligned. Once the components become aligned, the shift collar will slide over allowing the gearbox to be switched to reverse drive.

In the aforementioned assemblies, successful engagement of the reverser depends upon proper drive element or collar and gear alignment. Frequently, the operator must attempt several times to engage the reverser using either the manual lever or pedal, decreasing operator efficiency.

SUMMARY OF THE INVENTION

The present invention provides a mechanism for engaging and disengaging the reverse operation of a feederhouse of a harvesting apparatus. The mechanism solves the problem of accurate engagement between the shift collar or drive element and the reverse gear, teeth or splines and the forward gear, teeth or splines of the feederhouse transmission. The mechanism comprises an actuator, electrically controlled, which loads or compresses a spring, wherein the spring exerts a shifting force on a shift shaft or shift fork of the gearbox which moves the shift collar or drive element of the transmission into either a forward or reverse gear engagement.

According to the preferred embodiment, the mechanism includes a plunger. The actuator and plunger are mounted in series with the shift shaft or shift fork of the gearbox, on the bottom side of the feederhouse. The actuator drives the plunger and the plunger compresses the spring. The spring stores the energy provided by the actuator, allowing the shift inside the gearbox to occur when the gears, teeth or splines are correctly aligned. If the gears are meshed correctly, the shift occurs instantaneously. However, if misalignment is present, the spring retains force on the shift shaft or shift fork in the direction of the proposed shift. When the operator selects a shift from forward to reverse, or vice versa, the shift will take place automatically once the gears, teeth or splines are aligned properly.

The required motion to engage and disengage the feederhouse reverser is supplied by the actuator. Preferably, the actuator is an electrically driven device. A switch in the operator's station or cab allows the user to remotely actuate the actuator to complete the selected motion. Due to the energy stored in the spring, the operator can make a reverser shift selection once, and allow the system to engage when the shift collar is aligned with the selected one of either the forward or reverse gears, teeth or splines.

According to a further development of the shift control of the invention, the engine delivers rotary power to a controllable clutch. The clutch, when engaged, delivers rotary power to the transmission of the feederhouse. A controller is signal-connected to the controllable clutch, via appropriate signal conditioning, to control the engagement/disengagement of the clutch. The operator-controlled switch is signal-connected to the controller.

When the switch is thrown to engage, or alternately to disengage, the reverser, the controller disengages the clutch. A speed sensor monitors the speed of the transmission gears, such as via an output shaft engaged to the driven side of the clutch. When the shaft has stopped, the controller causes the actuation of the actuator. Additionally, the controller can then send a signal to the clutch to pulsate the clutch to cause a slow movement of the gears within the transmission until the reverse gears, teeth or splines, or alternately the forward gears, teeth or splines, are aligned with the shift collar gears, teeth or splines. Once aligned the shift occurs. The transmission can be configured to send a feedback signal to the controller, the signal confirming the successful occurrence of the shift. Alternatively, the controller can cause the clutch to pulsate only for a preset time interval, requiring a second attempt to shift if the shift has not successfully occurred. The controller then engages the clutch and full rotary power is once again communicated to the feederhouse transmission.

According to the present invention, a shift into reverse operation, or back to forward operation, can be accomplished by a simple action of throwing a switch. The operator need not manually jog the gears of the feederhouse transmission in order to mesh the reverse or forward gear assemblies. The shift will be automatically accomplished. The automatic control of the reverser operation will result in less damage due to operator error caused by attempting to shift while the transmission gears have not sufficiently decreased in speed. The switch is easier and more convenient for the operator to actuate compared to foot operated or hand operated push-pull cables. Furthermore the elimination of the push-pull cable eliminates a dust and noise entry point into the cab.

Numerous other advantages and features of the present invention will become readily apparent from the following detailed description of the invention and the embodiments thereof, from the claims and from the accompanying drawings.

BRIEF DESCRIPTION OF THE DRAWINGS

FIG. 3 is a sectional view on line 3—3 of FIG. 2 of the planetary transmission assembly showing the shift collar engaging the planetary output gear for forward drive.

FIG. 4 is a partial view, similar to FIG. 3 showing the shift collar engaging the ring gear clutch plate for reverse drive.

DETAILED DESCRIPTION OF THE PREFERRED EMBODIMENTS

Figure 1:
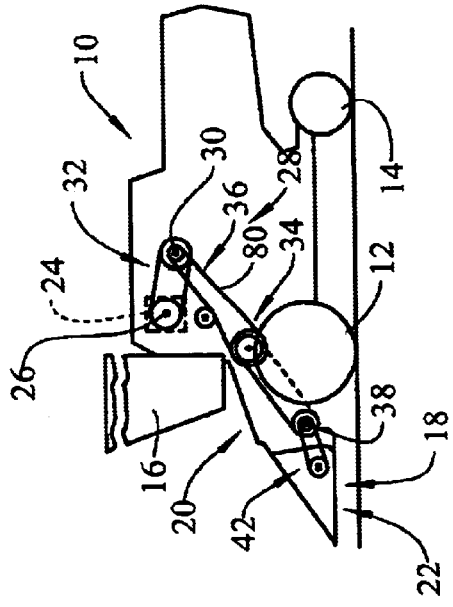
FIG. 1 is a schematic side elevational view of a combine embodying the invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 illustrates a self-propelled combine having a main separator body 10, mounted on a pair of forward drive wheels 12 and steerable rear wheels 14. An elevated operator's station 16 is mounted at the front of the separator body 10. A forward mounted header indicated generally by the numeral 18 is pivoted on a horizontal transverse pivot (not shown) at the front of the separator body 10 for vertical adjustment by conventional means. The header includes a feeding unit 20 and a gathering unit 22. A transversely oriented internal combustion engine 24 indicated in schematic outline only in FIG. 1, is mounted toward the front of the separator body 10 and has an output power shaft 26 extending from the left-hand side of the separator body. A belt-type drive system indicated in its entirety by the numeral 28 is disposed on the left side of the combine and transmits power from the engine power shaft 26 to the header 18.

The belt drive system 28 includes a primary countershaft 30 mounted on the combine body 10 and connected to the engine power shaft 26 by a primary countershaft belt drive 32. A movable countershaft assembly 34 is mounted on the left-hand side of the feeding unit 20 and is connected to the primary countershaft 30 by a header transfer drive indicated generally by the numeral 36. A header drive shaft 38 is mounted transversely beneath the forward end of the feeding unit 20 as shown most clearly in FIG. 2. The header drive shaft 38 is connected to the movable countershaft 30 by a header drive indicated generally by the numeral 40 in FIGS. 1 and 2. Final drives to the feeding unit 20 and the gathering unit 22 are taken from the header drive shaft 38 by conventional means such as the platform drive 42 indicated schematically in FIG. 1.

Figure 2:
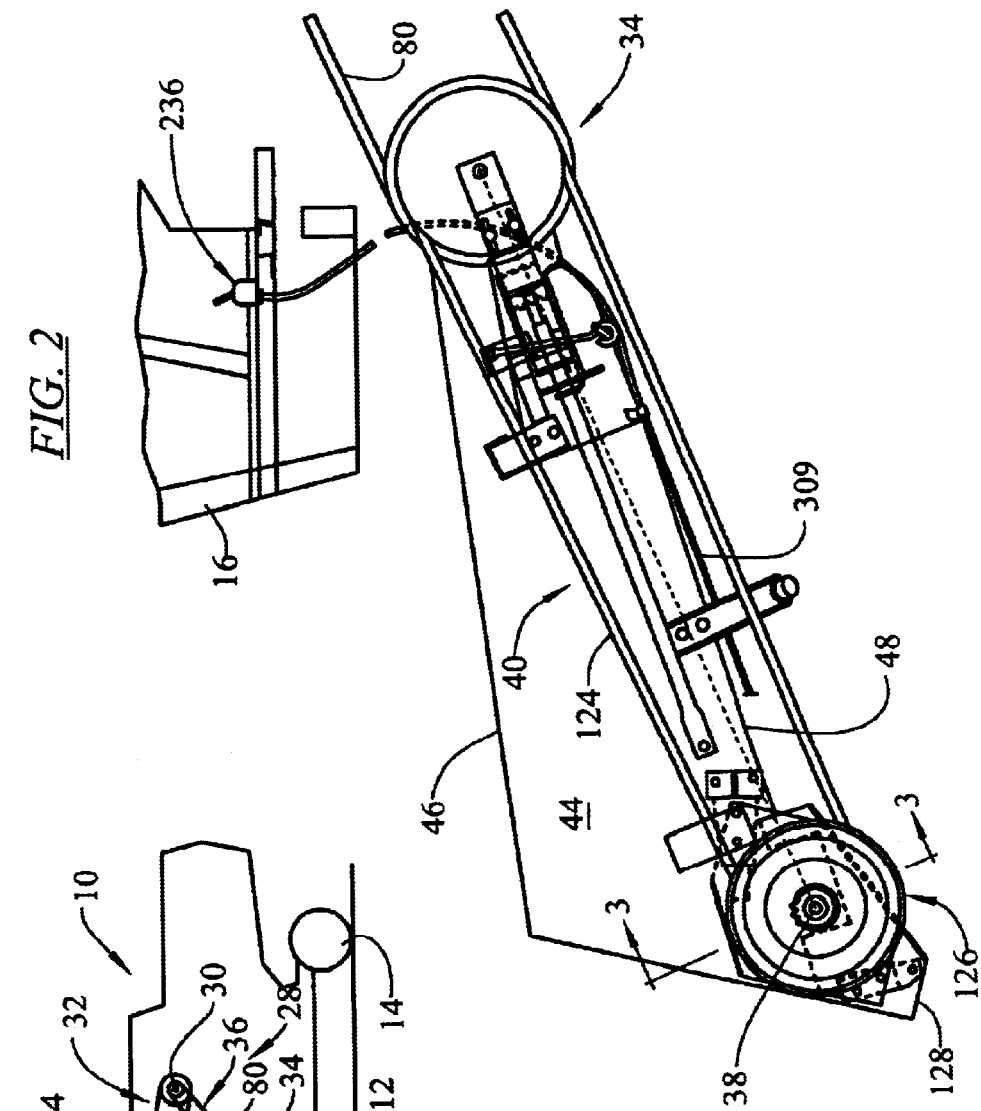
FIG. 2 is an enlarged semi-schematic partial side elevation of the combine of FIG. 1.

The feeding unit 20 shown in schematic outline in FIG. 2 includes a pair of opposite upright sidewalls 44, a top wall 46 and a bottom wall 48.

A V-belt 124 of the header drive 40 transmits power from the movable countershaft assembly 34 to the header drive shaft 38 via a transmission assembly indicated in its entirety by the numeral 126, coaxial with and drivingly engaging the header shaft 38.

The transmission assembly 126, best shown in FIG. 3, is mounted on the left-hand sidewall 44 of the feeding unit toward its forward end by a bracket assembly 128 (shown only in FIG. 2) and disposed so that the header drive shaft 38 lies transversely immediately beneath the bottom wall 48 of the feeding unit. The transmission assembly 126 combines, in an integrated unit, a planetary transmission indicated generally by the numeral 130 and a sheave assembly indicated generally by the numeral 132.

The sheave assembly 132, driven by the V-belt 124, is of the variable effective diameter torque-sensing or torque responsive type, and includes an axially fixed sheave element 134 and an axially adjustable sheave element 136. A compression spring 138 carried between a spring retainer 140 and the movable sheave element 136 biases that element axially towards the fixed sheave element 134 in the direction of increasing effective diameter. The torque-sensing or torque responsiveness of the sheave assembly 132 depends upon control of relative rotation between the two sheave elements 134 and 136, and is effected by a cam assembly 142 annularly contained between them.

The cam assembly 142 is so disposed between the sheave elements 134 and 136 that any tendency for relative rotation between the two sheave halves results in a cam action biasing the axially adjustable sheave element 136 toward sheave element 134. The sheave assembly 132 is rotatably carried on the header drive shaft 38 by a hub-like extension 144 of an input sun gear 146 journaled on the shaft 38 by a pair of the bearings 148. The sheave assembly 132 is drivably keyed and secured to the input gear hub 144 by a key 150 and setscrews 152 respectively.

The planetary transmission 130 includes a generally annular bell-shaped gear housing 154 that includes the actual attaching points (not shown) of the transmission assembly 126 to the bracket assembly 128. The inner end of the gear housing 154 includes a bearing housing 156 and the outer end has an annular flange 158.

A boss 160 having a bore 162 parallel to the header drive shaft and communicating with the interior of the gear housing 154 extends axially from the rearward side of the gear housing adjacent the bearing housing 156. A pinion carrier 164 closes the bell mouth of the gear housing 154 and includes a cover portion 166 secured to the flange 158 of the gear housing 154 by a plurality of fasteners 168. The pinion carrier 164 includes a pinion carrier structure 170 extending axially from the cover portion 166.

The gear housing 154 and the pinion carrier 164 together form a gear housing assembly through which the header drive shaft 38 rotatably extends, carried by bearings 172 and 174, housed in the bearing housing 156 of the gear housing and in a central bore of the pinion carrier 164, respectively. Annularly interposed between the bearings and the shaft are a shaft hub 176 and the input gear hub 144 respectively. A woodruff key 178 drivingly connects the shaft hub 176 to the shaft 38. An enlarged diameter portion of the shaft hub 176 extends within the gear housing 154 and includes external splines 180 and a snap ring groove 182 intersecting the splines.

The pinion carrier structure 170 includes a plurality of bores 184 carrying a plurality of pins 188 on which are journaled, by a plurality of bearings 190, pinion gears 192. Each pinion gear 192 includes, as integral parts, a first planetary pinion 194 immediately adjacent the pinion carrier cover and drivably engaging the input sun gear 146, and a second planetary pinion 196 immediately adjacent the first. The second planetary pinions 196 drivingly engage and carry a ring gear assembly 198 which includes a ring gear 200 and a concentrically dished clutch plate 202 secured to the ring gear by a plurality of fasteners 204. The ring gear assembly is free to float in the gear housing 154, its movement being limited radially only by the engagement of the ring gear 200 with the second planetary pinions 196, and axially by the confinement of the clutch plate 202 between adjacent faces 206 and 208 of the gear housing 154 and pinion carrier structure 170, respectively. An output sun gear 210 is interposed, concentrically with the header drive shaft 38, between the shaft hub 176 and the input sun gear 146. The output sun gear 210 includes a spur gear portion 212 drivably engaging the second planetary pinions 196 and, immediately adjacent the shaft hub 176, a hub-like extension 214 bearing external splines 216 matching those (180) of the shaft hub 176. The output sun gear 210 has an internal bore 218 exceeding the diameter of adjacent portions of the header drive shaft 38 and is maintained in position radially only by its engagement with the teeth of the second planetary pinions 196 and axially by its close confinement between the shaft of 176 and the input sun gear 146.

An internally splined shifting collar 220 is slidably carried on the matching splines of the shaft hub 176 and is axially disposed so that the internal splines 221 (shown in FIG. 3) selectively also engage (as shown in FIG. 3) or disengage the external splines 216 of the output sun gear 210 so that the shaft hub 176 is selectively coupled to, or uncoupled from, the output sun gear 210. An increased diameter outer portion of the shifting collar 220 bears an external splined section having external splines 222 matching internal splines 202a of the clutch plate 202. The inner end of the shifting collar has an external annular groove 224. The shifting collar 220 is also disposed axially so that the internal splines 202a of the clutch plate 202 selectively drivably engage (as shown in FIG. 4) or disengage the matching external splines 222 of the shifting collar so that the shaft hub 176 is selectively coupled to, or uncoupled from, the ring gear assembly 198.

A shifting assembly 226 has a shift shaft or shift fork 228 slidably disposed in the bore 162 of the boss 160 of the gear housing 154. The shaft 228 extends into the gear housing 154 and carries a shifter plate 230 that engages the external groove 224 of the shifting collar 220.

As previously stated, the header drive shaft 38 extends transversely beneath the feeding unit 20. Its right-hand end (not shown) extends beyond the right-hand sidewall 44 of the feeding unit and is journaled adjacent its end in a bearing supported by the feeding unit 20. Final drives to the feeding and gathering units are taken from the shaft 38 by conventional means including chain or splined couplers, a typical chain coupler half 238 being shown in FIG. 3, retained on the header drive shaft 38 by cap screw 240. A header drive arrangement, using splined couplers in the header drive shaft is disclosed in U.S. Pat. No. Re 26,512.

The input to the planetary transmission 130 is through the input sun gear 146 which is keyed to the driven sheave assembly 132, the gear and sheave assembly being journaled as a unit on header drive shaft 38. For normal (forward) harvesting operation, the operator, by means of a direction switch 236 mounted in the operator's station, shown in FIG. 2 and described below, moves the shifting collar 220 to the position shown in FIG. 3, which drivingly connects the output sun gear 210 with the header drive shaft 38 so that the shaft is driven through the planetary pinion 192 and output gear 210 at a speed considerably slower than that of the sheave assembly 132.

To drive the gathering and feeding unit in the reverse direction, for example to clear a blockage, the operator moves the shifting collar 220 to the position shown in FIG. 4 where and the ring gear assembly 198 is drivingly connected to the header drive shaft 38. Drive is now transmitted from the input sun gear 146 through the planetary pinion 192 and the ring gear 198 so that the shaft 38 is driven in a reverse direction.

Figure 5:
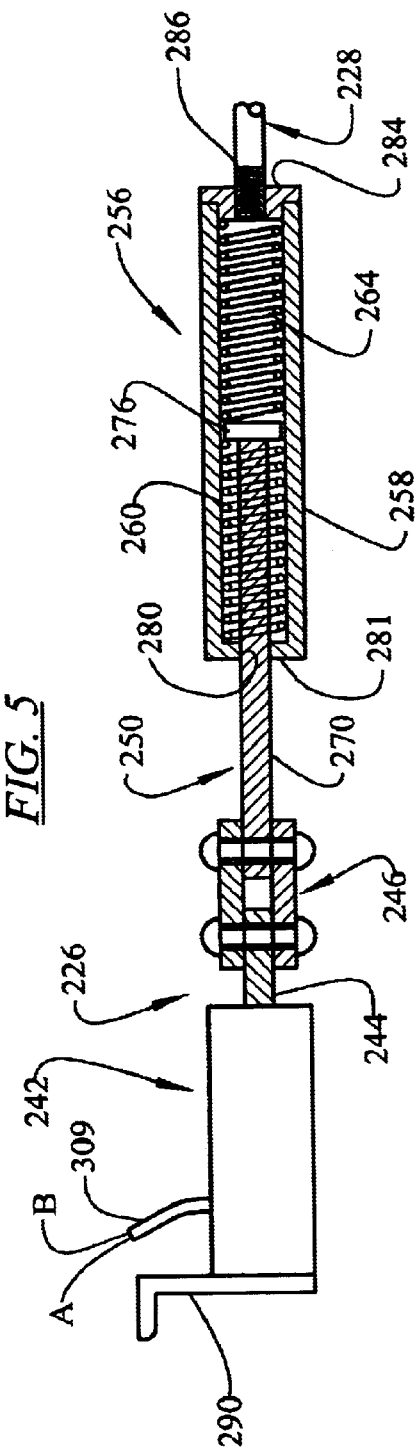
FIG. 5 is an enlarged partial sectional fragmentary view of the shift mechanism of the invention.

FIG. 5 illustrates the shifting mechanism 226 in accordance with the invention. The shifting mechanism 226 includes an electrical actuator 242, such as a linear actuator, having an actuator rod 244 connected via a chain link 246 to a plunger 250. The actuator can be a Warner ELECTRAK ONE with a seventy-five pound force to a two-inch stroke, and a maximum current draw of 6A at 12VDC.

A spring system 256 is connected to the actuator rod 244. The spring system 256 includes a housing or tube 258 holding a first compression spring 260 and a second compression spring 264. The plunger 250 includes a rod 270 penetrating into the tube 258, the rod 270 connected to a head 276, the head 276 enclosed in the tube 258. The tube has a reduced diameter opening 280 on a base end 281 thereof to retain the first spring 260, and a threaded closure 284 fit on an opposite end of the cylinder to retain the second spring 264. The threaded closure includes a threaded central hole 286 that allows the threaded closure to be screwed onto a threaded end of the shift shaft 228 of the transmission 130. The spring system is contained inside the tube to prevent distortion of the springs, and to maintain the direction of force.

In operation, the operator engages the feederhouse reverser by changing the state of the switch 236 located in the operator's station. When the switch is closed, and current flows to the actuator, the actuator 242 will retract the actuator rod 244 a pre-selected distance to the left in FIG. 5, such as two inches, to pull the plunger 250. The plunger 250 will apply a compression force on the first spring 260, compressing the first spring. The first spring 260 in turn applies pressure on the base end 281 of the tube 258. This movement causes the spring assembly 256 and shift shaft 228 to be pulled toward the actuator 242, generating the shift force. The shift force remains via the compressed spring 260 until the internal splines 202a of the clutch plate align with the splined section 222 of the shift collar 220. When alignment occurs, the feederhouse reverser is engaged by the shift force.

To disengage the feederhouse reverser, a similar sequence occurs. The actuator 242 will extend, moving the plunger 250 a distance to the right in FIG. 5, such as two inches to compress the second spring 264. The compressed spring 264 causes a force to be applied on the shift shaft 228. If the shifting collar internal splines 221 are not precisely aligned with the external splines 216 of the output sun gear 210, the spring 264 will remain compressed to store energy. As the gearbox rotates, the splines 221, 216 will eventually align and be meshed by force from the spring 264 via the shift shaft 228.

Each spring is in compression only during one direction of movement.

A bracket 290 can be used to secure the shift mechanism 226 to the bottom wall 48 (FIG. 2) of the feederhouse, to restrict unwanted movement during extension and retraction. All force supplied by the actuator 242 is applied to the plunger 250.

Figure 6:
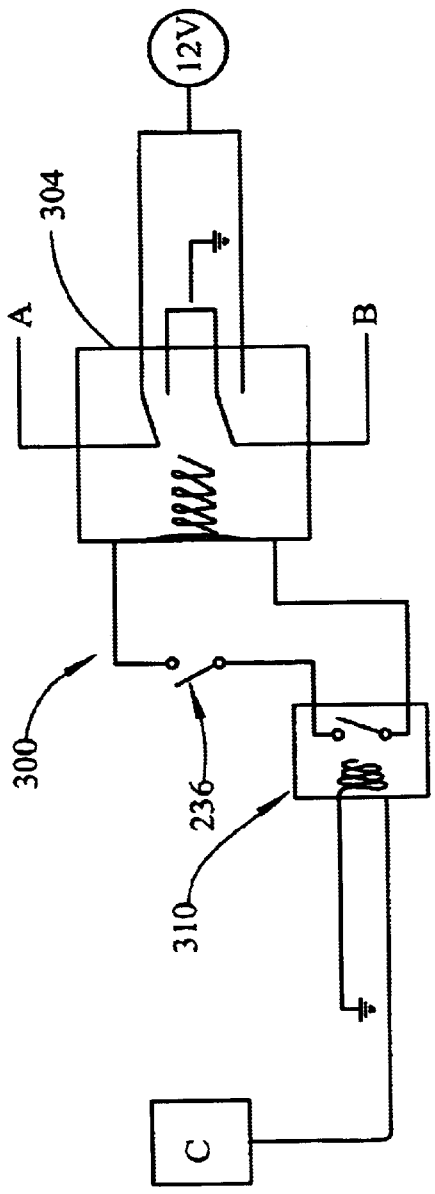
FIG. 6 is an electrical schematic of the control system for the shift mechanism of FIG. 5.

FIG. 6 illustrates the electrical system 300 for the shift mechanism 226. The switch 236 can be a single-pull, single-throw (SPST) switch located in the instrument panel of the operator's station. An electrical relay 302, such as a dual-pull, dual-throw (DPDT) relay, is used to reduce the current draw through the switch 236, and to reduce the length and gauge of the wiring. Actuation is achieved by reversing the polarity of the supply voltage by throwing the switch 236. Conductors A and B are thus alternatively at drive voltage, such as 12 volts, or ground depending on the selected direction of shift of the actuator 242. The conductors are routed to the actuator 242 via a cable 309.

To maintain a high reliability and high product life, the switch can be integrated into a control system so that the shift cannot occur while the combine is at full throttle or while the separator is engaged. A combine controller C can be signal-connected to a relay or switch 310. The switch 310 is connected in series with the switch 236. The switch 236 for the reverser can thus be electrically dependent on the throttle position or on the header shut-off switch. As a result, the shift of the feederhouse into reverse gear cannot occur unless damage-preventive steps are taken.

Figure 7:
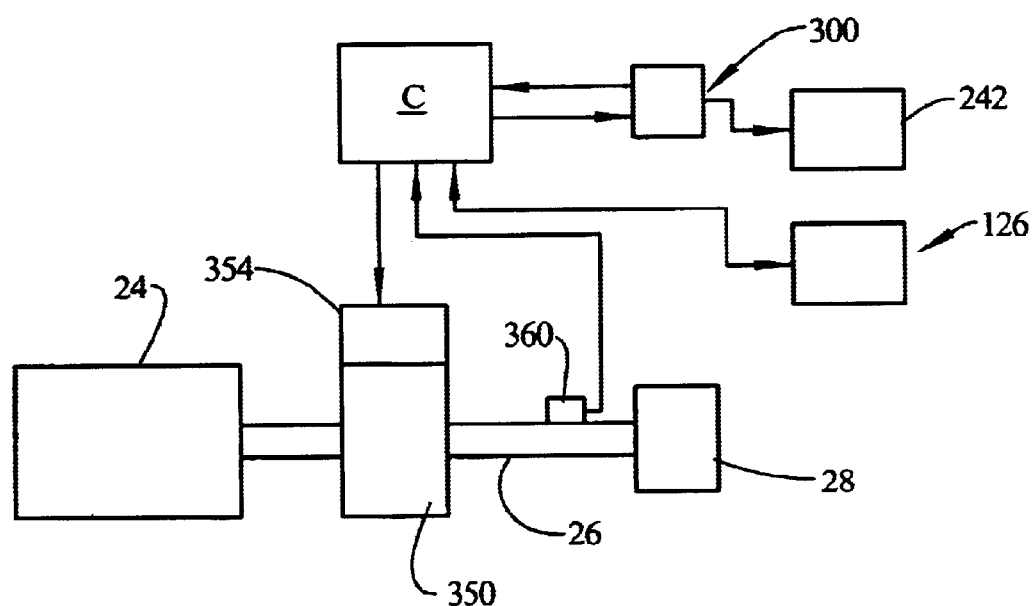
FIG. 7 is a schematic of a further development of the control system for the shift mechanism of FIG. 5.

FIG. 7 illustrates a further development of the control of the reverser shift mechanism of the invention. According to this control scheme, the engine delivers rotary power to a hydraulically operated clutch 350 which is spring-engaged and hydraulically disengaged. The clutch 350, when engaged, delivers rotary power to the output shaft 26 which delivers rotary power to the belt system 28. A hydraulic proportional control valve 354 delivers a controlled-pressure hydraulic fluid to the clutch 350. The controller C is signal-connected to the control valve 354, via appropriate signal conditioning, to control the engagement/disengagement of the clutch 350. The switch electrical system 300 is signal-connected to the controller C.

When the switch 236 is thrown to engage the reverser, the controller disengages the clutch, via control of the control valve 354. A speed sensor 360, such as a Hall effect sensor, monitors the speed of the output shaft. When the shaft 26, and thus the clutch plate 202, has sufficiently slowed or stopped for engagement of the internal splines 202a of the clutch plate 202 to the splined section 222 of shift collar 220, the electrical system 300 energizes the actuator 242. Additionally, the controller C can then send a signal to the clutch control valve 354 to pulsate the clutch 350 to cause a slow movement of the gears within the transmission until the internal splines 202a of the clutch plate 202 align with the splined section 222 of the shift collar 220. Once aligned the shift occurs. The transmission 126 can be configured to send a feedback signal to the controller C, the signal confirming the successful occurrence of the shift. Such a feedback signal can be, for example, based on the movement of the shift shaft 228. The controller C then engages the clutch 350, via the control valve 354, and full rotary power is once again communicated to the feederhouse transmission. Alternatively, the controller can cause the clutch to pulsate only for a preset time interval, requiring a second attempt to shift if the shift has not successfully occurred.

To disengage the feederhouse reverser, a similar sequence occurs. When the switch 236 is thrown to disengage the reverser, to revert to normal, forward operation, the controller disengages the clutch, via control of the control valve 354. A speed sensor 360, such as a Hall effect sensor, monitors the speed of the output shaft. When the shaft 26, and thus the output sun gear 210, has sufficiently slowed or stopped for engagement of the output sun gear 210 with the shift collar 220, the electrical system 300 energizes the actuator 242. Additionally, the controller C can then send a signal to the clutch control valve 354 to pulsate the clutch 350 to cause a slow movement of the gears within the transmission until the shifting collar internal splines 221 are precisely aligned with the external splines 216 of the output sun gear 210. As the gearbox rotates, the splines 221, 216 will eventually align and be meshed by force from the spring 264 via the shift shaft 228, i.e., the shift occurs. The transmission 126 can then send a feedback signal to the controller C, the signal confirming the successful occurrence of the shift. Alternatively, the controller can cause the clutch to pulsate only for a preset time interval, requiring a second attempt to shift if the shift has not successfully occurred. The controller C then engages the clutch 350, via the control valve 354, and full rotary power is once again communicated to the feederhouse transmission.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A mechanism for shifting a first gear element into engagement with a second gear element of a transmission, comprising:
    a speed sensor that is configured to send a speed signal proportional to a speed of said second gear;
    an actuator;
    a controller configured for receiving a shift signal from an operator and the speed signal from said speed sensor and configured to cause movement of said actuator when said speed signal is below a pre-selected speed; and
    a spring arranged to be deflected by differential movement between said actuator and said first gear element to store energy upon movement of said actuator.

2. The mechanism according to claim 1, wherein said actuator comprises an electrical actuator.

3. The mechanism according to claim 1, wherein
    said first gear comprises a shift collar arranged on a shaft and shiftable along an axial direction to mesh with said second gear;
    said energy releasable to shift said collar to mesh with the second gear.

4. The mechanism according to claim 1,
    further comprising a rotary power mechanism that is arranged to rotate said second gear;
    said controller being configured to receive a shift signal from an operator and being signal-connected to said rotary power mechanism and being configured to issue a shift selection signal that slows down said second gear, and then controls said rotary power mechanism to rotate said second gear at a speed slower than normal operating speed until said first and second gears are aligned to be meshed;

said actuator configured to receive said shift selection signal from the controller to move said actuator; and said spring arranged to store potential energy if said first gear element is misaligned with said second gear, and configured to automatically release said potential energy when said first gear aligns with said second gear to shift the first gear to mesh with said second gear.

5. The mechanism according to claim 4, wherein said rotary power mechanism comprises a source of rotary power and a clutch, said clutch arranged between said source and said second gear, and wherein said controller is in signal-communication with said clutch, and at a time after said controller receives said shift signal, said controller is configured to send a signal to said clutch to pulsate said clutch to modulate rotary power from said source to said second gear.

6. The mechanism according to claim 1, wherein said spring is arranged to store potential energy if said first gear element is misaligned with said second gear, and configured to automatically release said potential energy when said first gear aligns with said second gear to shift the first gear to mesh with said second gear.

7. A mechanism for shifting a first gear element into meshing engagement with a second gear element of a transmission, comprising:

a rotary power mechanism that is arranged to rotate said second gear element;

a controller that is configured to receive a shift signal from an operator and to issue a shift selection signal, and that is signal-connected to said rotary power mechanism and is configured to thereby slow down said second gear element, and to operate said rotary power mechanism to rotate said second gear element at a speed slower than normal operating speed;

an actuator configured to receive said shift selection signal from the controller to generate a shift kinetic energy; and an energy storage device arranged to store said kinetic energy as potential energy if said first gear element is misaligned with said second gear element, and configured to automatically release said potential energy when said first gear element aligns with said second gear element to shift the first gear element to mesh with said second gear element.

8. The mechanism according to claim 7, wherein said actuator comprises an electrical actuator.

9. The mechanism according to claim 7, further comprising:

a speed sensor sensing speed of said second gear element, said speed sensor signal-connected to said controller to send a speed signal to said controller;

said controller configured to delay the sending of said shift selection signal until said speed signal is below a predetermined speed.

10. The mechanism according to claim 7, wherein said rotary power mechanism comprises a source of rotary power and a clutch, said clutch arranged between said source and said second gear element, and wherein said controller is in signal-communication with said clutch, and after said controller receives said shift signal, said controller is configured to send a signal to said clutch to pulsate said clutch to modulate rotary power from said source to said second gear element.

11. The mechanism according to claim 10, further comprising:

a speed sensor sensing speed of said second gear element, said speed sensor signal-connected to said controller to send a speed signal to said controller;

said controller configured to delay the sending of said shift selection signal until said speed signal is below a predetermined speed.

12. The mechanism according to claim 10, wherein said first gear element comprises a shift collar arranged on a shaft and shiftable along an axial direction to mesh with said second gear element.

13. A feederhouse transmission for a combine, comprising:

a controller arranged to receive a forward or reverse shift signal from an operator and to send a shift selection signal;

a source of rotary power;

a first gear train for driving a feeder unit of the feederhouse in a forward direction;

a second gear train for driving the feeder unit of the feederhouse in a reverse direction;

a speed sensor sensing speed of said second gear train, said speed sensor signal-connected to said controller to send a speed signal to said controller;

a shift collar arranged on a shaft and shiftable along an axial direction to alternately mesh with a selected one of either the first gear train or the second gear train to engage the first gear train or the second gear train to the source of rotary power, depending on the shift direction;

an actuator responsive to said shift selection signal from said controller to move in a selectable shift direction;

said controller configured to delay the sending of said shift selection signal until said speed signal is below a predetermined speed; and at least one spring arranged to be deflected by differential movement between said actuator when moved in a reverse shift direction and said shift collar to store energy upon movement of said actuator, said energy releasable to shift said collar to mesh with the second gear train.

14. The transmission according to claim 13, wherein said actuator comprises an electrical actuator.

15. The mechanism according to claim 13, wherein said controller is signal-connected to control the output of said source of rotary power to said selected first or second gear train, and said controller is configured to thereby slow down said selected first or second gear train, and then to control the output of said source of rotary power to said selected first or second gear train to drive said selected first or second gear train at a speed slower than normal operating speed until said collar and said selected first or second gear train are aligned to be meshed.

16. The mechanism according to claim 15, further comprising a clutch, said clutch arranged between said source and said selected one of said first and second gear trains, and wherein said controller is in signal-communication with said clutch, and after said controller receives said shift signal, said controller is configured to send a signal to said clutch to pulsate said clutch to modulate rotary power from said source to said selected one of said first and second gear trains.

* * * * *